US009463570B2

(12) United States Patent
Kim et al.

(10) Patent No.: US 9,463,570 B2
(45) Date of Patent: Oct. 11, 2016

(54) WEARABLE ROBOT AND CONTROL METHOD THEREOF

(71) Applicant: Samsung Electronics Co., Ltd., Suwon-si, Gyeonggi-do (KR)

(72) Inventors: Gyung Rock Kim, Yongin-si (KR); Ji Min Kim, Seoul (KR); Young Bo Shim, Seoul (KR); Jong Do Choi, Suwon-si (KR); Tae Sin Ha, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1 day.

(21) Appl. No.: 14/565,156

(22) Filed: Dec. 9, 2014

(65) Prior Publication Data

US 2015/0158175 A1  Jun. 11, 2015

(30) Foreign Application Priority Data

Dec. 10, 2013  (KR) ........................ 10-2013-0152886

(51) Int. Cl.
*G05B 19/00* (2006.01)
*B25J 9/00* (2006.01)

(52) U.S. Cl.
CPC .... *B25J 9/0006* (2013.01); *G05B 2219/40305* (2013.01); *G05B 2219/40413* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,628,766 | B1 * | 12/2009 | Kazerooni | A61F 5/00 601/35 |
| 8,585,620 | B2 * | 11/2013 | McBean | A61F 5/0127 600/546 |
| 8,926,534 | B2 * | 1/2015 | McBean | A61F 5/0127 601/24 |
| 2006/0046908 | A1 * | 3/2006 | Rastegar | A61H 3/00 482/91 |
| 2006/0046909 | A1 * | 3/2006 | Rastegar | A63B 69/0028 482/91 |
| 2006/0149338 | A1 * | 7/2006 | Flaherty | A61H 1/0255 607/49 |
| 2006/0211956 | A1 * | 9/2006 | Sankai | A61B 5/04888 601/5 |

(Continued)

FOREIGN PATENT DOCUMENTS

KR  KR-20120060578 A  6/2012

*Primary Examiner* — Jonathan L Sample
(74) *Attorney, Agent, or Firm* — Harness, Dickey & Pierce, P.L.C.

(57) ABSTRACT

Disclosed herein is a wearable robot for assisting a wearer's intended motion, including: one or more links configured to support the wearer; one or more joints unit configured to connect the links to each other; a controller configured to determine the wearer's intended motion, and to calculate at least one torque based on the wearer's intended motion; and a driver configured to generate the calculated torque in the joints. According to the wearable robot, a wearer's intended motion may be determined in real time based on a velocity of the wearer's center of gravity. At this time, by using a pressure sensor, reliability of the motion determination may increase. Also, joint movements may be effectively controlled according to the wearer's intended motion.

18 Claims, 14 Drawing Sheets

(56) References Cited

U.S. PATENT DOCUMENTS

| | | | |
|---|---|---|---|
| 2009/0030530 A1* | 1/2009 | Martin | A61B 5/4851 623/53 |
| 2009/0270766 A1* | 10/2009 | Yasuhara | A61H 3/00 600/595 |
| 2009/0312155 A1* | 12/2009 | Ikeuchi | A61H 3/008 482/51 |
| 2010/0113980 A1 | 5/2010 | Herr et al. | |
| 2010/0121232 A1* | 5/2010 | Sankai | A61H 3/008 601/23 |
| 2010/0268351 A1* | 10/2010 | van der Merwe | G05B 15/02 623/24 |
| 2011/0264238 A1* | 10/2011 | van der Merwe | A61F 2/54 623/24 |
| 2012/0143374 A1 | 6/2012 | Mistry et al. | |
| 2013/0173058 A1* | 7/2013 | Seo | G05B 15/00 700/260 |
| 2013/0173060 A1* | 7/2013 | Yoo | B25J 9/1633 700/261 |
| 2013/0197408 A1* | 8/2013 | Goldfarb | A61F 5/0102 601/35 |
| 2013/0310979 A1* | 11/2013 | Herr | B62D 57/032 700/258 |
| 2014/0172169 A1* | 6/2014 | Yoo | B25J 9/1633 700/261 |
| 2014/0188280 A1* | 7/2014 | Lee | B25J 9/1607 700/263 |
| 2014/0277739 A1* | 9/2014 | Kornbluh | B25J 9/0006 700/260 |
| 2014/0330431 A1* | 11/2014 | Hollander | B25J 9/0006 700/245 |
| 2015/0012111 A1* | 1/2015 | Contreras-Vidal | A61B 5/4851 623/25 |
| 2015/0141878 A1* | 5/2015 | Roy | A61H 3/00 601/34 |

\* cited by examiner

FIG. 10

|    |   | B | M | F | | B | M | F |
|----|---|---|---|---|---|---|---|---|
| HL | U | \multicolumn{3}{c}{ascending} | | | | |
|    | M | \multicolumn{3}{c}{stabilization} | | \multicolumn{2}{c}{Stand ($t>t_{Stand}$)} | |
|    | D | \multicolumn{3}{c}{descending} | | | | |

|    |   | B | M | F | | B | M | F |
|----|---|---|---|---|---|---|---|---|
| LL | U | | | | | | | |
|    | M | backwarding | stabilization | forwarding | | \multicolumn{2}{c}{Sit ($t>t_{Sit}$)} | |
|    | D | | | | | | | |

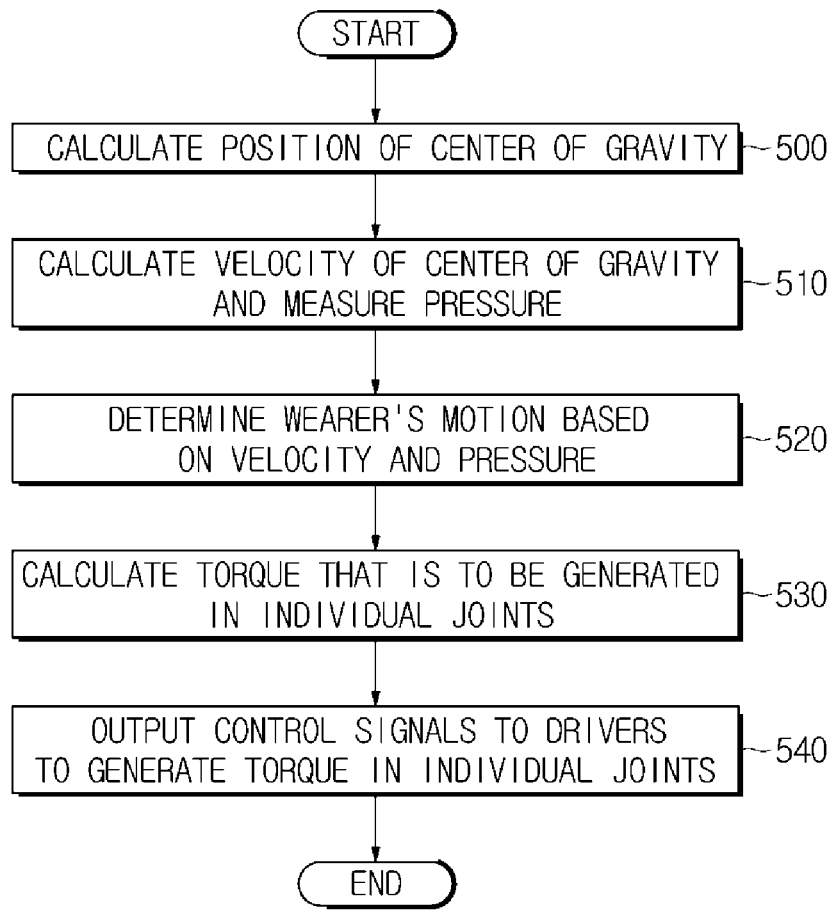

WEARABLE ROBOT AND CONTROL METHOD THEREOF

CROSS-REFERENCE TO RELATED APPLICATION

This application claims the benefit of Korean Patent Application No. 2013-0152886, filed on Dec. 10, 2013 in the Korean Intellectual Property Office, the entire disclosure of which is incorporated herein by reference.

BACKGROUND

1. Field

Example embodiments relate to a wearable robot, and a control method thereof. In some example embodiments, the wearable robot is configured to use information about the center of gravity.

2. Description of the Related Art

Wearable robots may assist a human's muscle power in performing motion for various purposes, such as a military purpose, an industrial purpose, a rehabilitation purpose, and a welfare purpose.

Examples of wearable robots for assisting muscle power are a muscle power enhancing wearable robot for enhancing healthy people's exercise ability, a muscle power assisting wearable robot for helping people having weak muscle power to maintain their daily life without inconvenience, and an artificial muscle power providing wearable robot for enabling people who cannot produce normal motions.

The muscle power assisting wearable robot can be classified into an upper extremity wearable robot for upper extremity motions, and a lower extremity wearable robot for lower extremity motions. Specifically, the lower extremity wearable robot assists movements of a wearer's hips, knees, and ankle joints in order for the wearer to more easily take motions, such as walking, sitting, and standing.

Interest in a lower extremity robot for recognizing a wearer's intended motion and effectively assisting joint movements is increasing.

SUMMARY

Some example embodiments provide a wearable robot configured to use information about the center of gravity, and a control method thereof.

Additional aspects of the example embodiments will be set forth in part in the description which follows and, in part, will be obvious from the description, or may be learned by practice of the disclosure.

In accordance with some example embodiments, a wearable robot for assisting a wearer's intended motion, includes: one or more links configured to support the wearer; one or more joints unit configured to connect the links to each other; a controller configured to determine the wearer's intended motion, and to calculate at least one torque based on the wearer's intended motion; and a driver configured to generate the calculated torque in the joints.

The controller may calculate a velocity of the wearer's center of gravity, and determine the wearer's intended motion based on the calculated velocity of the wearer's center of gravity.

The wearable robot may further include a pressure sensor configured to sense the wearer's weight, wherein the controller determines the wearer's movement state based on the calculated velocity of the wearer's center of gravity and pressure measured by the pressure sensor, and determines the wearer's intended motion based on the wearer's movement state.

The controller may compare the calculated velocity of the wearer's center of gravity to a first reference value, and compare the measured pressure to a second reference value, so as to determine the wearer's movement state.

The controller may compare a first direction magnitude of the calculated velocity of the wearer's center of gravity to at least one first direction reference value of the first reference values, and compare a second direction magnitude of the calculated velocity of the wearer's center of gravity to at least one second direction reference value of the first reference values.

The first direction may be perpendicular to the second direction.

If the controller determines that the wearer's movement state is a state in which the wearer stands, the controller may determine that the wearer's intended motion is a standing motion.

If the controller determines that the wearer's movement state is a state in which the wearer sits, the controller may determine that the wearer's intended motion is a sitting motion.

If the controller determines that the wearer's intended motion is a standing motion or a sitting motion, the controller may calculate the torque.

The controller may calculate the torque n times so that the wearable robot assists the wearer's intended motion through n steps, wherein n≥1.

The controller may calculate the torque using the following equation:

$$\tau = J^T \cdot F,$$

where $\tau$ is at least one torque, F is a predetermined force for moving the wearer's center of gravity, J is a Jacobean matrix, and T is transpose.

In accordance with other example embodiments, a control method of a wearable robot for assisting a wearer's intended motion, includes: determining the wearer's intended motion; calculating at least one torque based on the wearer's intended motion; and generating the calculated torque in one or more joints connecting one or more links to each other.

The determining of the wearer's intended motion may include calculating a velocity of the wearer's center of gravity, and determining the wearer's intended motion based on the calculated velocity of the wearer's center of gravity.

The control method may further include, at a pressure sensor, measuring pressure, wherein the determining of the wearer's intended motion comprises determining the wearer's movement state based on the calculated velocity of the wearer's center of gravity and the measured pressure, and determining the wearer's intended motion based on the wearer's movement state.

The determining of the wearer's intended motion may include comparing the calculated velocity of the wearer's center of gravity to a first reference value, and comparing the measured pressure to a second reference value so as to determine the wearer's movement state.

The determining of the wearer's intended motion may include comparing a first direction magnitude of the calculated velocity of the wearer's center of gravity to at least one first direction reference value of the first reference values, and comparing a second direction magnitude of the calculated velocity of the wearer's center of gravity to at least one second direction reference value of the first reference values.

The first direction may be perpendicular to the second direction.

The determining of the wearer's intended motion may include if the wearer's movement state is determined to be a state in which the wearer stands, determining that the wearer's intended motion is a standing motion.

The determining of the wearer's intended motion may include if the wearer's movement state is determined to be a state in which the wearer sits, determining that the wearer's intended motion is a sitting motion.

The calculating of the at least one torque based on the wearer's intended motion may include calculating the torque if the motion is a standing motion or a sitting motion.

The calculating of the at least one torque based on the wearer's intended motion may include calculating the torque n times so that the wearable robot assists the wearer's intended motion through n steps, wherein n≥1.

The calculating of the at least one torque based on the wearer's intended motion may include calculating the torque using the following equation:

$$\tau = J^T \cdot F,$$

where T is at least one torque, F is a predetermined force for moving the wearer's center of gravity, J is a Jacobean matrix, and T is transpose.

According to the wearable robot and the control method thereof, a wearer's intended motion can be determined in real time based on a velocity of the wearer's center of gravity. Further, by using a pressure sensor, reliability of the motion determination may increase. Also, joint movements may be effectively assisted based on the wearer's intended motion.

BRIEF DESCRIPTION OF THE DRAWINGS

These and/or other aspects of the example embodiments will become apparent and more readily appreciated from the following description of some of the example embodiments, taken in conjunction with the accompanying drawings of which:

FIG. 10 is a table related to standing and sitting motions;

FIG. 13 is a flowchart illustrating a control method of a wearable robot, according to some example embodiments.

DETAILED DESCRIPTION

Figure 1A:
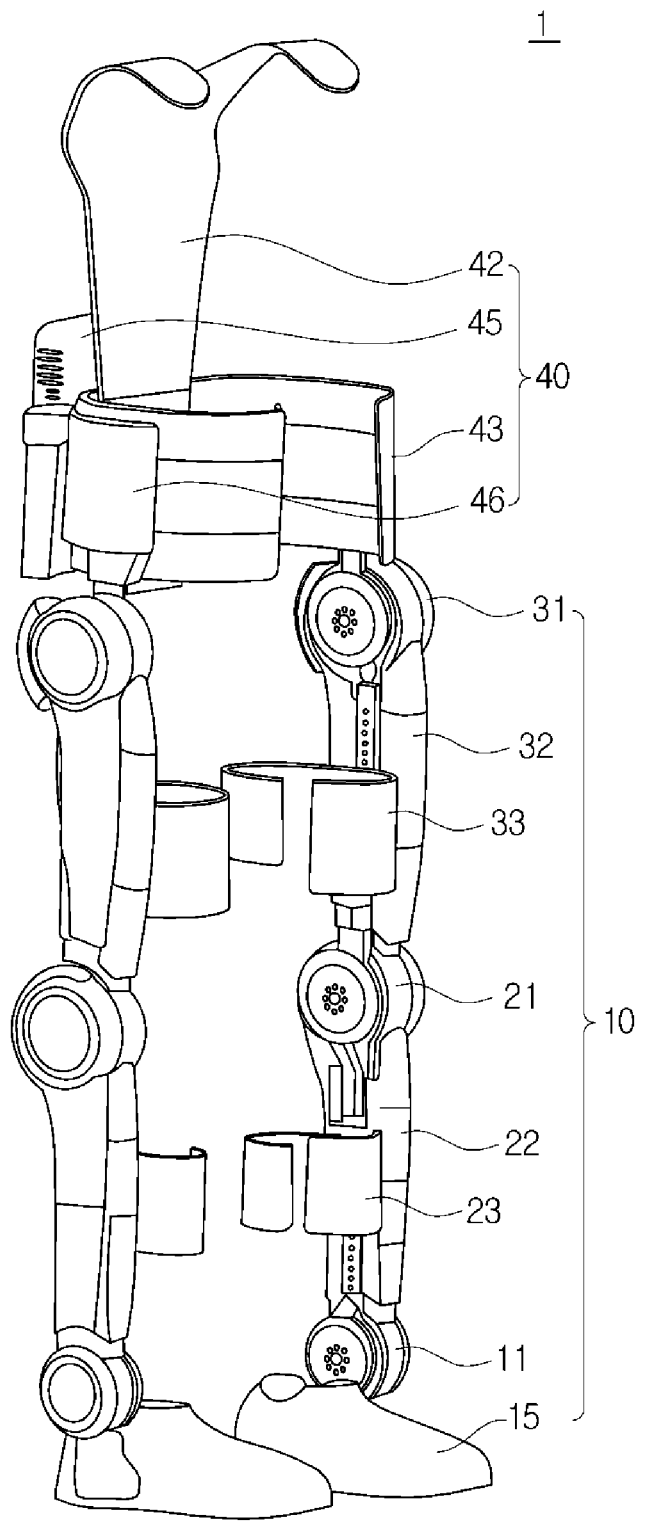
FIG. 1A is a perspective view of a front part of a wearable robot according to some example embodiments.

Reference will now be made in detail to the example embodiments of the present disclosure, some examples of which are illustrated in the accompanying drawings, wherein like reference numerals refer to like elements throughout.

Hereinafter, a wearable robot and a control method thereof according to embodiments of the present disclosure will be described in detail with reference to the accompanying drawings.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1B:
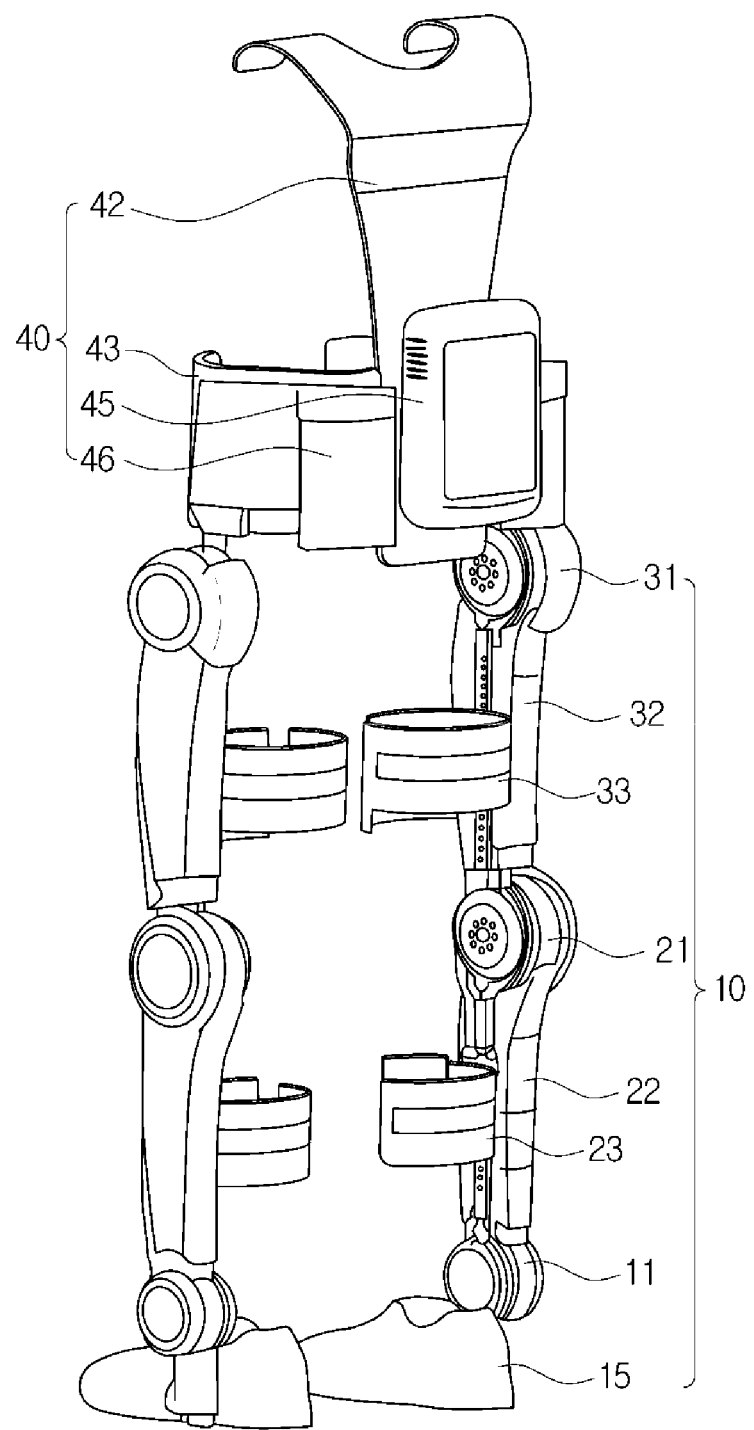
FIG. 1B is a perspective view of a rear part of a wearable robot according to some example embodiments.

FIG. 1A is a perspective view of a front part of a wearable robot according to some example embodiments, and FIG. 1B is a perspective view of a rear part of a wearable robot according to some example embodiments.

As illustrated in FIGS. 1A and 1B, a wearable robot 1 may have an external skeleton structure of a joint system similar to that of a human. More specifically, the wearable robot 1 may include a joint assisting unit 10 that is worn on the entire or a part of a wearer's lower extremities to assist the wearer's joints, and a main body 40 that controls the joint assisting unit 10 and/or collects various information.

The joint assisting unit 10 may include joint units 11, 21, and 31, link units 22 and 32, and a foot rest unit 15.

The link units 22 and 32 function to support the wearer's lower extremities. The link units 22 and 32 may be provided in the outer sides of the wearer's lower extremities, and have structures corresponding to the wearer's left and right lower extremities. The link units 22 and 32 are referred to as a first link 22 and a second link 32.

The first link 22 functions to support the wearer's lower leg. The first link 22 may be designed in various shapes as necessary. For example, the first link 22 may be designed in a bar shape, as illustrated in FIGS. 1A and 1B. Also, the length of the first link 22 may be adjustable. Accordingly, the wearer may adjust the length of the first link 22 to correspond to the length of his/her lower leg before or after wearing the wearable robot 1.

One end of the first link 22 may be connected to the second link 32, and the other end of the first link 22 may be connected to the foot rest unit 15. Also, a fastening unit 23 may be attached to the inner side of the first link 22. The fastening unit 23 may be implemented in the form of a band or belt, and secure the first link 22 to the wearer's lower leg.

The second link 32 may function to support the wearer's femoral region. The second link 32 may be in a bar shape, like the first link 22, as illustrated in FIGS. 1A and 1B, although the thickness and size of the second link 32 may be different from those of the first link 22. However, the second link 32 may be designed in another shape as necessary. Also, the length of the second link 32 may be adjustable, like the first link 22. Accordingly, the wearer may adjust the length of the second link 32 to correspond to his/her femoral region before or after wearing the wearable robot 1.

One end of the second link 32 may be connected to a waist fastening unit 43 which will be described later, and the other end of the second link 32 may be connected to the first link 22. A fastening unit 33 for securing the second link 32 to the wearer's femoral region may be provided in the inner side of the second link 32.

The joint units 11, 21, and 31 correspond to a human's lower extremity joints, and may move or rotate in various directions and at various angles according to control signals from a controller 200 which will be described later in regard to FIG. 3.

In some example embodiments, the first joint 11 corresponds to an ankle joint, and is provided in a connection part between the first link 22 and the foot rest unit 15. The second joint 21 corresponds to a knee joint, and is provided in a connection part between the second link 32 and the first link 22. Also, the third joint 31 corresponds to a hip joint, and is provided in a connection part between the waist fastening unit 43 and the second link 32.

The individual joints 11, 21, and 31 may have at least one Degree Of Freedom (DOF) for movement or rotation. Herein, the DOF is a DOF in Forward Kinematics or in Inverse Kinematics, and means the number of independent variables that need to represent a position of a certain object. For example, an object that is in a 3 Dimensional (3D) space composed of x-, y-, and z-axes has 3 DOF (positions on the respective axes) to determine a spatial position of the object, and 3 DOF to determine a spatial orientation of the object. If a certain object is movable on the individual axes and rotatable with respect to the individual axes, the object can be understood to have 6 DOF.

As discussed in more detail below in regard to FIG. 3, each of the joint units 11, 21, and 31 may include a driver 400 for movement and/or rotation. The driver 400 may generate various magnitudes of torque for the respective joint units 11, 21, and 31 according to control signals from the controller 200 so that the respective joint units 11, 21, and 31 can move or rotate in various directions and at various angles. The driver 400 may be implemented as, for example, at least one motor to generate a desired (or, alternatively, a predetermined) magnitude of torque according to electrical energy. As another example, the driver 400 may be implemented as at least one vacuum pump or at least one hydraulic pump to generate a desired (or, alternatively, a predetermined) magnitude of torque according to pressure.

The foot rest unit 15 is a part on which the wearer's foot is rested. The foot rest unit 15 may further include a fastening unit (not shown) to secure the wearer's foot on the foot rest unit 15.

Figure 2:
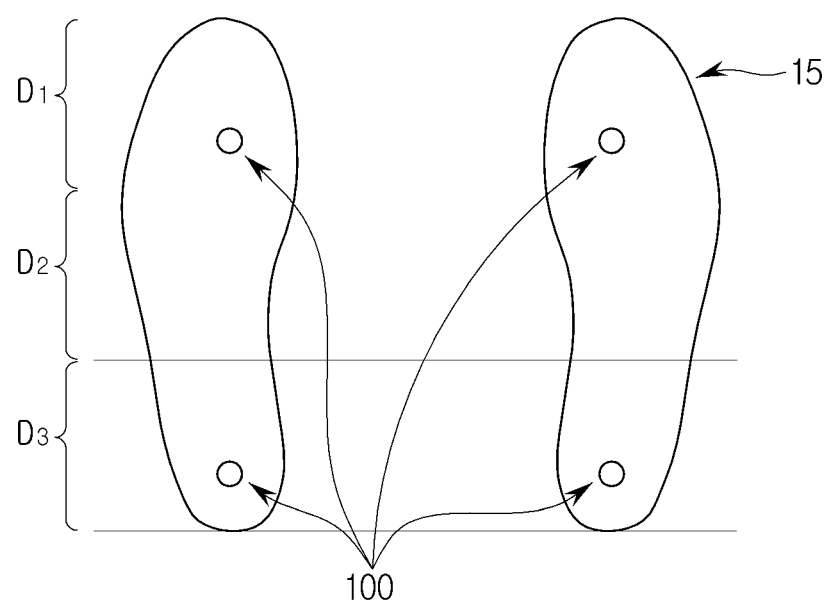
FIG. 2 is a bottom view of foot rest units including pressure sensors, according to some example embodiments.

The foot rest unit 15 may include a desired (or, alternatively, a predetermined) sensor to determine whether the wearer has worn the wearable robot 1 or to determine the wearer's intended motion. For example as illustrated in FIG. 2, in order to determine whether a wearer intends to stand or sit, the foot rest unit 15 may include at least one pressure sensor 100 to sense a wearer's weight. The controller 200 may determine a degree by which a wearer's sole contacts the ground using the pressure sensor 100.

FIG. 2 is a bottom view of foot rest units including pressure sensors, according to some example embodiments.

Referring to FIG. 2, the foot rest unit 15 may be divided into a first domain D1 on which a forefoot is rested, a second domain D2 on which a midfoot is rested, and a third domain D3 on which a rearfoot is rested. At least one pressure sensor 100 may be provided in at least one domain of the first domain D1, the second domain D2, and the third domain D3. FIG. 2 shows a case in which pressure sensors 100 of a left foot rest unit 15 are arranged to respectively correspond to pressure sensors 100 of a right foot rest unit 15. However, the pressure sensors 100 needs not to correspond to each other and the pressure sensors 100 may be arranged in any one of the left and right foot rest units 15.

Referring again to FIGS. 1A and 1B, the main body 40 of the wearable robot 1 may include the waist fastening unit 43, a third link 42, a housing 45, and a power supply 46.

The waist fastening unit 43 is worn on the wearer's waist. The third link 42 may be secured on the wearer's back through the waist fastening unit 43 so as to support the wearer's waist and back. The third link 42 may be designed in various shapes. For example, as illustrated in FIGS. 1A and 1B, the third link 42 may be designed in the shape of a curved plate. Also, the length of the third link 42 may be adjustable. Accordingly, the wearer may adjust the length of the third link 42 to correspond to the length of his/her upper body before or after wearing the wearable robot 1.

The housing 45 and the power supply 46 may be movable along the outer side of the waist fastening unit 43.

The controller 200 of the wearable robot 1 may be installed in the housing 45 to generate a control signal for controlling the joint assisting unit 10. The control signal may be transferred to the joint assisting unit 10 through wired/wireless communication.

The controller 200 may include various processors, such as a Central Processing Unit (CPU) or a Graphic Processing Unit (GPU). The housing 45 may include a Printed Circuit Board (PCB) on which the controller 200 is installed, and various kinds of storage devices may be installed in the housing 45, as necessary.

For example, the controller 200 may include a processor and a memory (not shown).

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the processor as a special purpose computer to perform the operations illustrated in FIG. 13, such that the controller 200 determines an intended motion of a wearer of the wearable robot 1, and calculates a torque to apply to joints thereof based on the intended motion.

The instructions may be stored on a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

Also, the housing 45 may include a manipulation unit (not shown) to allow the wearer to input various information for operating the wearable robot 1 or to manipulate individual devices, thus providing a User Interface (UI).

The power supply 46 may supply power to various devices in the housing 45 and/or to the joint units 11, 21, and 31 of the joint assisting unit 10. The power supply 46 may be a primary battery or a secondary battery. If the power supply 46 is a primary battery, the primary battery may be a mercury battery, a manganese battery, an alkaline battery, or a lithium battery. If the power supply 46 is a secondary battery, the secondary battery may be a nickel-cadmium (Ni—Cd) battery, a nickel-hydride (Ni—NH) battery, a lead-acid battery, a lithium-ion (Li-ion) battery, or a lithium-polymer battery.

The power supply 46 may be installed in the housing 45.

Figure 3:
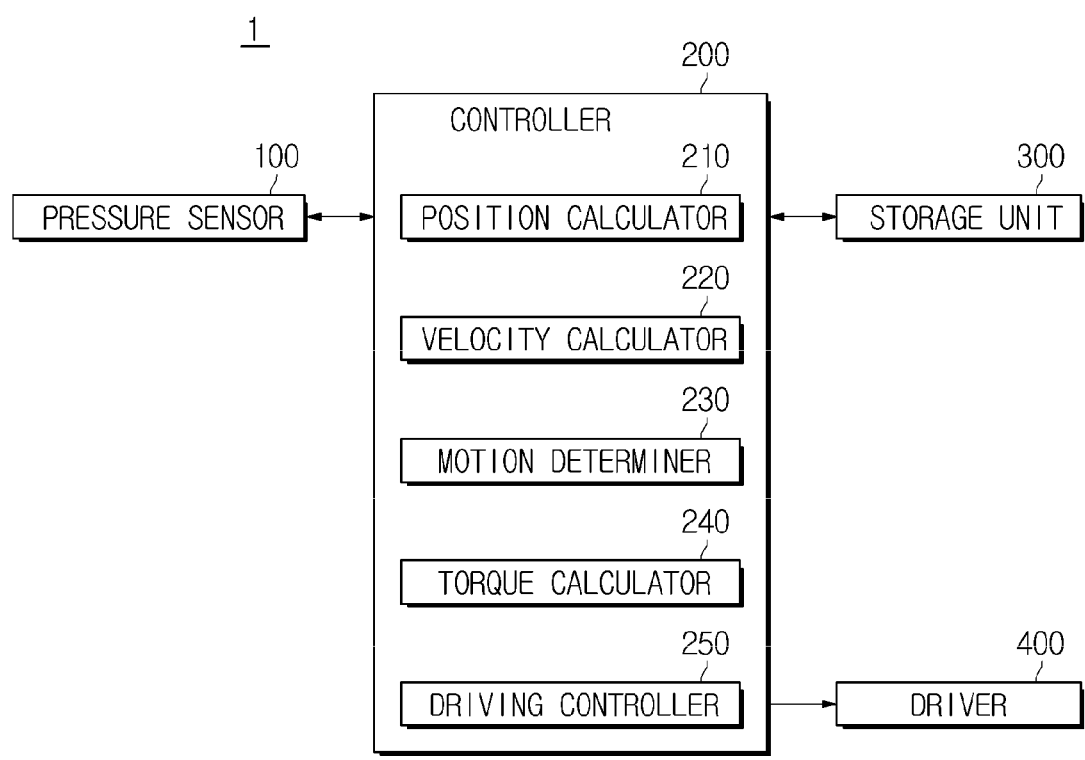
FIG. 3 is a control block diagram of a wearable robot according to some example embodiments.

FIG. 3 is a control block diagram of a wearable robot according to some example embodiments.

Referring to FIG. 3, the wearable robot 1 may include the pressure sensor 100, the controller 200, a storage unit 300, and the driver 400 in order to assist joint movements when a wearer stands or sits.

The pressure sensor 100 may be provided as at least one unit in the foot rest unit 15 (see FIG. 2) as described above. The pressure sensor 100 may measure a change in pressure such as a Ground Reaction Force (GRF) that is applied in the opposite direction of gravity so as to determine whether a wearer stands. The pressure sensor 100 may be implemented as a capacitor sensor, a piezoelectric sensor, or a strain gauge according to its usage method.

The capacitor sensor is a pressure sensor that uses a phenomenon in which increases in positive (+) and negative (−) charges cause an increase in the intensity of current. The increase in the intensity of current may be due to a change in thickness of an insulator when stress is applied, based on the magnitude of current when positive (+) and negative (−) poles are charged with the insulator in between. The piezoelectric sensor is a pressure sensor that uses a phenomenon in which charges are generated to change the magnitude of current when the structure of a piezoelectric material such as a Si composite changes due to stress. Also, the strain gauge is a pressure sensor that uses a phenomenon in which when the length of a resistor made of a fine wire such as a coil, changes due to stress, resistance of the fine wire changes accordingly.

The controller 200 may include a position calculator 210, a velocity calculator 220, a motion determiner 230, a torque calculator 240, and a driving controller 250.

For example, the processor may be programmed with instructions that configure the controller 200 as a special purpose computer to operate as the position calculator 210, the velocity calculator 220, the motion determiner 230, the torque calculator 240, and the driving controller 250.

As discussed below with reference to FIGS. 4 to 6, the position calculator 210 may calculate a position of a wearer's center of gravity.

Figure 4:
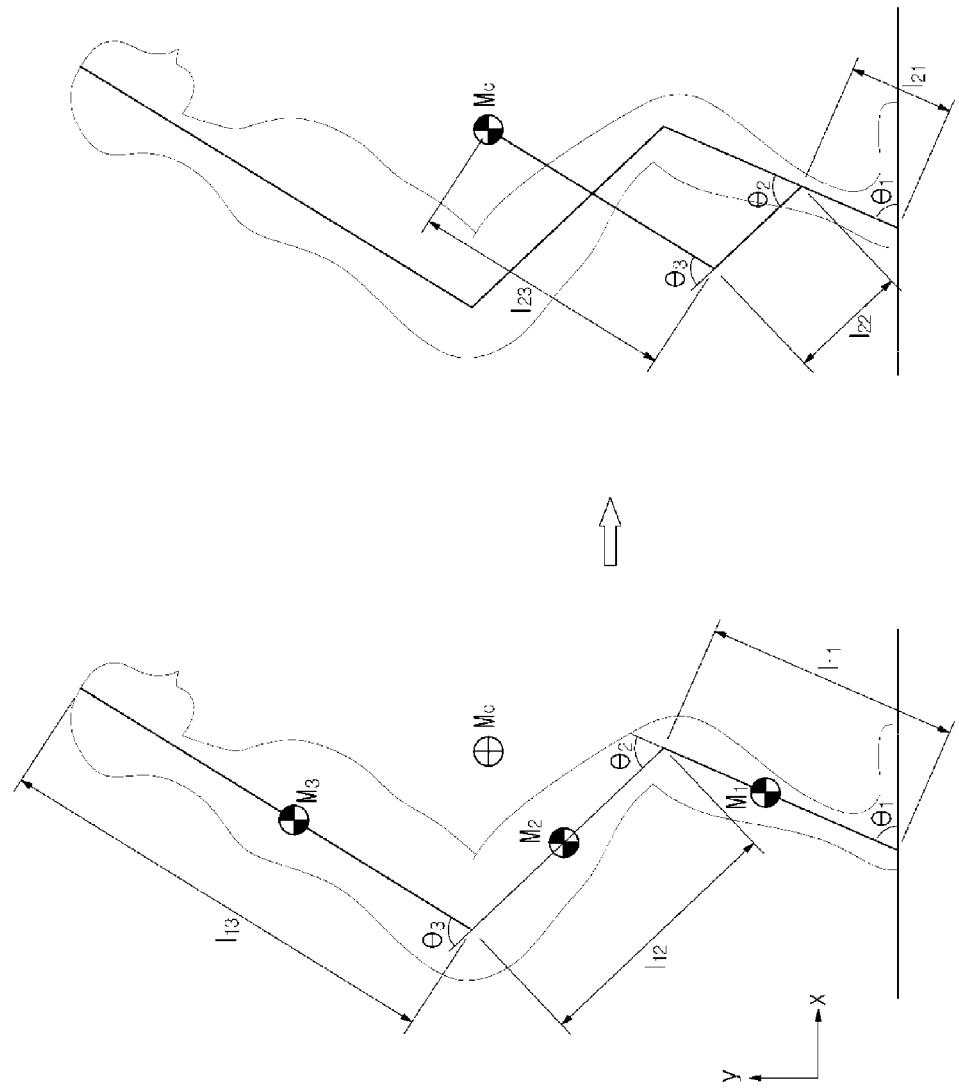
FIG. 4 is a view for describing a method of calculating a wearer's center of gravity.

FIG. 4 is a view for describing a method of calculating a wearer's center of gravity.

Referring to the left part of FIG. 4 and FIG. 1, the wearable robot 1 may be structured with the first link 22, the second link 32, and the third link 42. That is, the wearable robot 1 may be represented as a 3-link structure.

The length and weight of the first link 22 are defined as l11 and M1, respectively, the length and weight of the second link 32 are defined as l12 and M2, respectively, and the length and weight of the third link 42 are defined as l13 and M3, respectively. An angle of the first link 22 with respect to the ground is defined as θ1, an angle of the second link 32 with respect to the first link 22 is defined as θ2, and an angle of the third link 42 with respect to the second link 32 is defined as θ3.

Based on the definitions, the position calculator 210 may calculate a position of the wearer's center $M_c$ of gravity using equation (1), below.

$$\begin{aligned} x_c &= (p_1 \cdot k_1 + p_2 + p_3) \cdot l_{11} \cdot \cos(\theta_1) + (p_2 \cdot k_2 + p_3) \cdot \\ & \quad l_{12} \cdot \cos(\theta_1 + \theta_2) + (p_3 \cdot k_3) \cdot l_{13} \cdot \cos(\theta_1 + \theta_2 + \theta_3) \\ &= l_{21} \cdot \cos(\theta_1) + l_{22} \cdot \cos(\theta_1 + \theta_2) + \\ & \quad l_{23} \cdot \cos(\theta_1 + \theta_2 + \theta_3) \end{aligned} \quad \text{(Eq. 1)}$$

$$\begin{aligned} Y_c &= (p_1 \cdot k_1 + p_2 + p_3) \cdot l_{11} \cdot \sin(\theta_1) + (p_2 \cdot k_2 + p_3) \cdot \\ & \quad l_{12} \cdot \sin(\theta_1 + \theta_2) + (p_3 \cdot k_3) \cdot l_{13} \cdot \sin(\theta_1 + \theta_2 + \theta_3) \\ &= l_{21} \cdot \sin(\theta_1) + l_{22} \cdot \sin(\theta_1 + \theta_2) + \\ & \quad l_{23} \cdot \sin(\theta_1 + \theta_2 + \theta_3), \end{aligned}$$

where $x_c$ is an x-axis coordinate of the center $M_c$ of gravity, $y_c$ is a y-axis coordinate of the center $M_c$ of gravity, $p_i$ is a relative ratio $$p_i = \frac{M_i}{M_1 + M_2 + M_3}$$

of $M_i$ with respect to the entire mass, and $k_i$ is a ratio of a distance to the center of gravity of each link. That is, $k_1$ is a ratio of a distance to the center of gravity of the first link 22 with respect to the length of the first link 22, $k_2$ is a ratio of a distance to the center of gravity of the second link 32 with respect to the length of the second link 32, and $k_3$ is a ratio of a distance to the center of gravity of the third link 42 with respect to the length of the third link 42. For example, if the length of the first link 22 is 0.6 m, and a position of the center of gravity is the center of the first link 22, $l_{11}$=0.6 then $k_1$=0.5.

The 3-link structure may change positions as illustrated in the right part of FIG. 4, based on the position of the wearer's center $M_c$ of gravity. That is, by reducing or extending the lengths of the individual links 22, 32, and 42 while maintaining the angles θ1, θ2, and θ3, one end of a 3-link structure corresponds to the position of the center Mc of gravity The 3-link structure that has not changed is defined as a first structure, and the 3-link structure that has changed is defined as a second structure. In the second structure, the length of a first link 28 is defined as 121, the length of a second link 38 is defined as 122, and the length of a third link 48 is defined as 123. According to equation (1), the x-axis and y-axis coordinates of the center Mc of gravity are calculated based on the newly defined link lengths 121, 122, and 123.

The angles of the second structure may be the same as the corresponding angles of the first structure. That is, the corresponding parts between the first and second structures may have the same angles. More specifically, an angle of the first link 28 with respect to the ground in the second structure is identical to the angle θ1 of the first link 22 with respect to the ground in the first structure, an angle of the second link 38 with respect to the first link 28 in the second structure is identical to the angle θ2 of the second link 32 with respect to the first link 22 in the first structure, and an angle of the third link 48 with respect to the second link 38 in the second structure is identical to the angle θ3 of the third link 42 with respect to the second link 32 in the first structure.

Accordingly, adjusting the angles of the second structure may be the same as adjusting the angles of the first structure. For example, increasing the angle θ1 of the first link 28 with respect to the ground by α1 in the second structure is the same as increasing the angle θ1 of the first link 22 with respect to the ground by a1 in the first structure.

Also, generating torque in order to adjust the angles of the second structure is the same as generating torque in order to adjust the angles of the first structure. For example, generating torque in a connection part between the first link 28 and the ground in order to adjust the angle θ1 in the second structure is the same as generating torque in a connection part (that is, the first joint 11 (see FIG. 1A)) between the first link 22 and the ground in order to adjust the angle θ1 in the first structure.

Therefore, the following description will be given based on the second structure.

Figure 5:
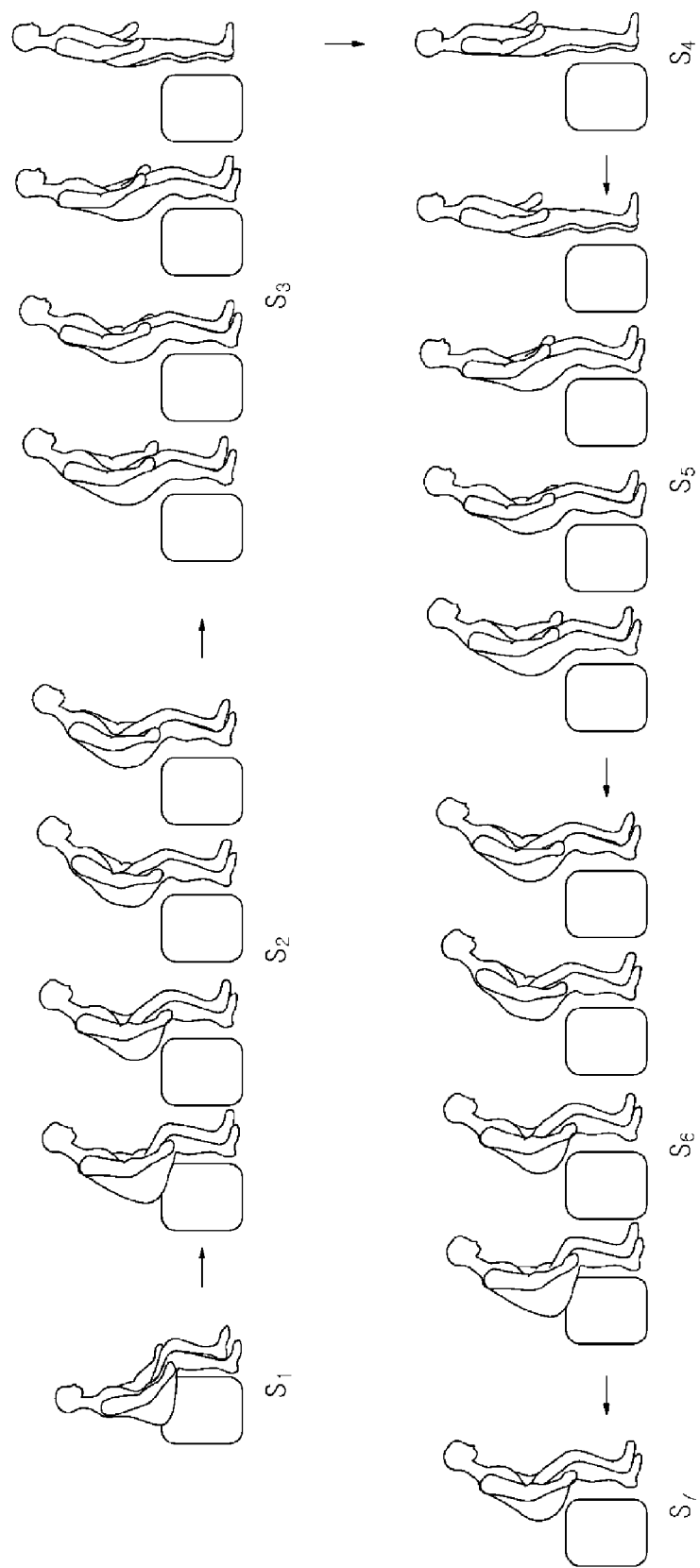
FIG. 5 illustrates a wearer's motions when he/she stands and sits.

FIG. 5 illustrates a wearer's motions when he/she stands and sits.

Referring to FIG. 5, a wearer's standing motion may be divided into four operations S1 to S4. First, in operation S1, the wearer is seated. When the wearer is sitting in operation S1, the wearer's lower extremities are bent, and the wearer's upper body stands upright. In operation S2, the wearer bends his/her upper body forward and puts his/her weight on both feet in order to stand up. In operation S3, the wearer straightens his/her bent lower extremities, and straightens his/her bent upper body. Finally, in operation S4, the wearer stands. When the wearer stands in operation S4, the wearer's lower extremities are straightened, and the wearer's upper body also stands upright.

Likewise, the wearer's sitting motion may be divided into four operations S4 to S7. In operation S4, the wearer is standing, similar to operation S4 described above. In operation S5, the wearer bends his/her upper body forward, and bends his/her lower extremities in order to sit down. In operation S6, the wearer leans his/her upper body back, and reduces his/her weight put on both feet. In operation S7, the wearer is seated, similar to operation S1 described above. Accordingly, in operation S7, the wearer's lower extremities are bent, and the wearer's upper body stands upright. As such, the wearer's sitting motion may be the inverse of the wearer's standing motion. Accordingly, the following description will be given with regard to the wearer's standing motion.

Figure 6:
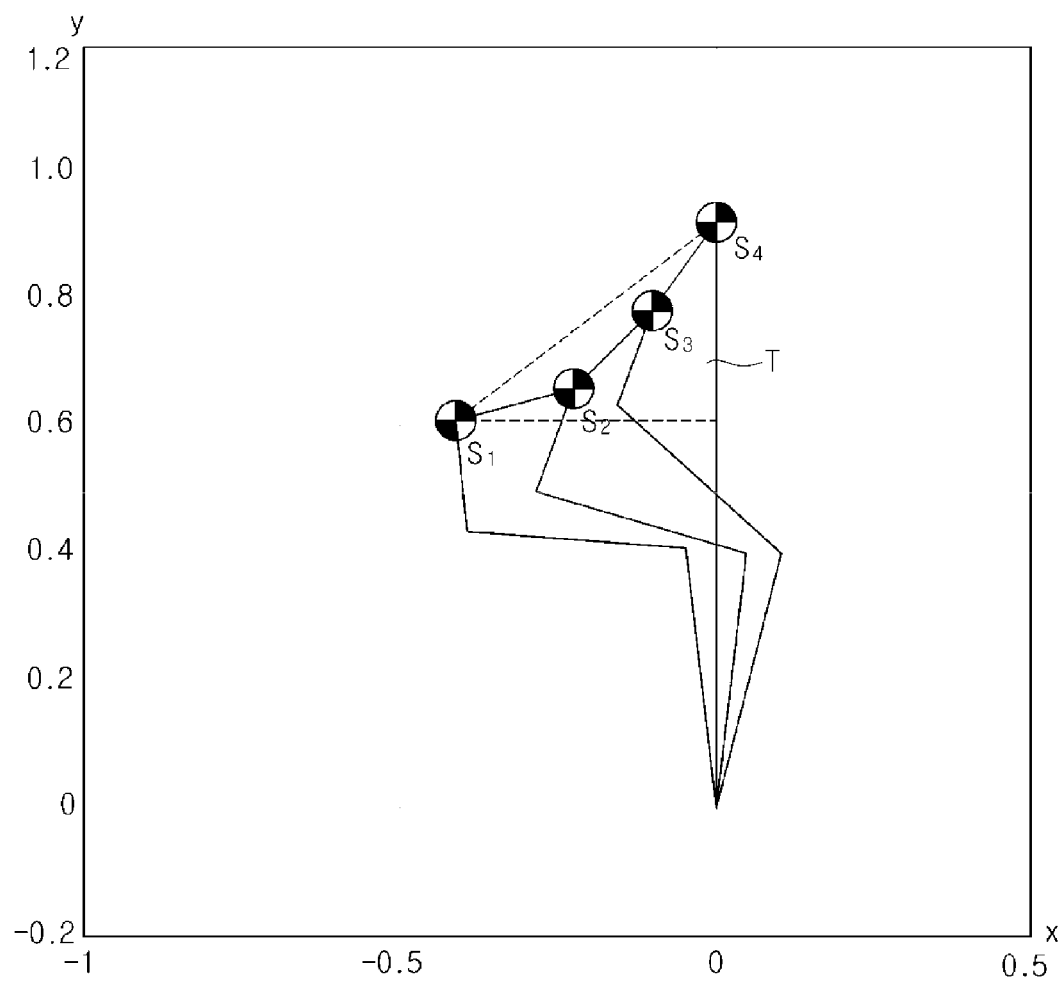
FIG. 6 shows a 3-link motion trajectory for a standing motion.

FIG. 6 shows a 3-link motion trajectory for a standing motion.

Referring to FIG. 6, in operation S1, the angle θ1 of the first link 28 with respect to the ground, the angle θ2 of the second link 38 with respect to the first link 28, and the angle θ3 of the third link 48 with respect to the second link 38 are nearly 90°. In operation S2, the angles θ1, θ2, and θ3 are reduced as compared to the angles in operation S1, and a position of the center of gravity moves in the positive directions on the x- and y-axes. In operation S3, the angles θ1, θ2, and θ3 are further reduced as compared to the angles in operation S2 and the position of the center of gravity further moves in the positive directions on the x- and y-axes than in operation S2. Then, in operation S4, the angles θ1, θ2, and θ3 become 0°, and the position of the center of gravity further moves in the positive directions on the x- and y-axes than in operation S3.

The angles θ1, θ2, and θ3 in step S1 may be different from those shown in FIG. 6, according to the wearer's sitting position. For example, if the wearer is seated in a lower position than that shown in FIG. 6, the angle θ1 in operation S1 may be 90° and the angles θ2 and θ3 in operation S1 may be close to 120°.

However, aspects that a trajectory in which the angles θ1, θ2, and θ3 are reduced when the wearer stands is made, and that the position of the center of gravity in a triangle region T moves in the positive directions on the x- and y-axes are the same as those shown in FIG. 6.

The position calculator 210 may calculate a position of the wearer's center of gravity, and detect a change in position of the wearer's center of gravity based on the calculated position.

The velocity calculator 220 may calculate a velocity of the wearer's center of gravity, based on the position of the wearer's center of gravity and/or the change in position of the wearer's center of gravity, acquired from the position calculator 210. As will be appreciated to one of ordinary skill in the art, the velocity calculator 220 may calculate the velocity of the wearer's center of gravity using various methods.

If the velocity calculator 220 calculates a velocity of the wearer's center of gravity, a change in velocity of the wearer's center of gravity may be detected. This will be described in detail with reference to FIG. 7, below.

Figure 7:
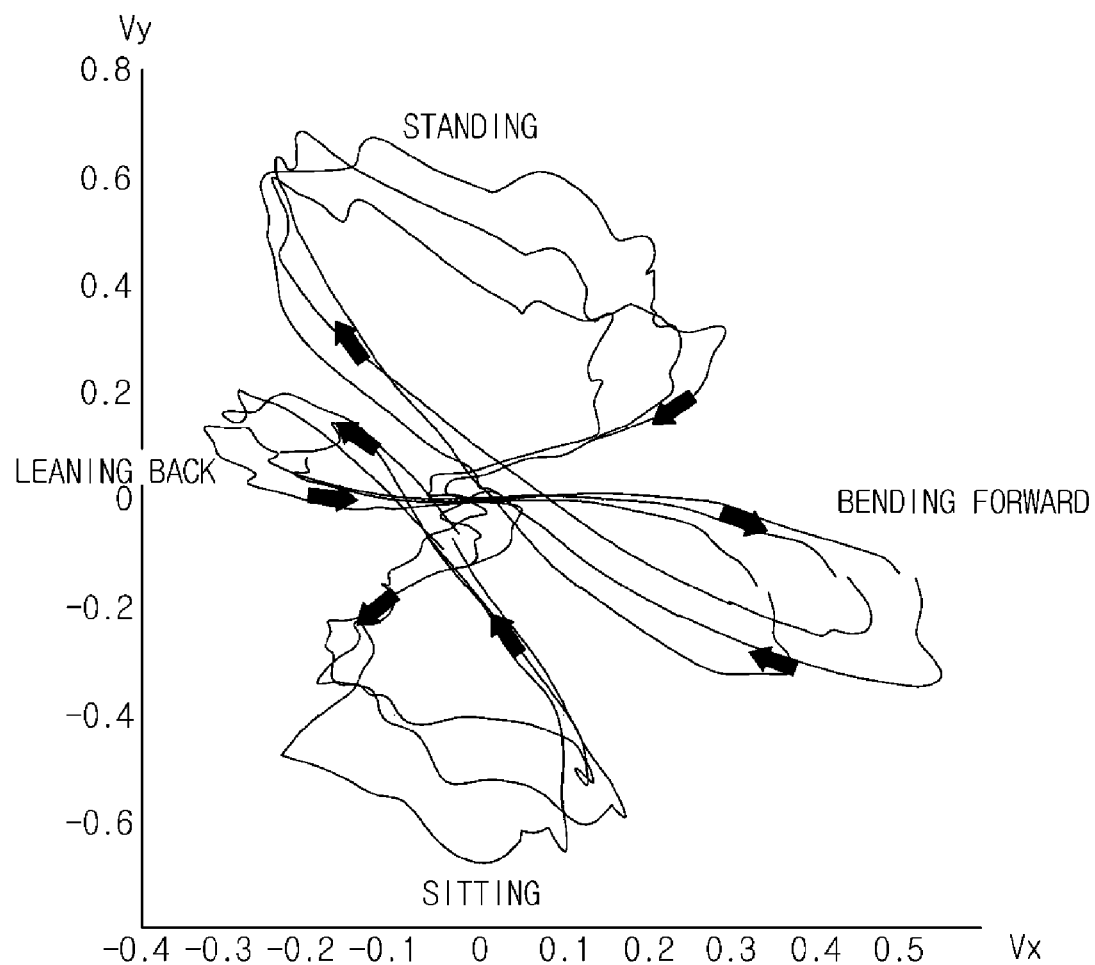
FIG. 7 is a velocity graph showing velocities of the centers of gravity for standing and sitting motions.

FIG. 7 is a velocity graph showing the velocities of the centers of gravity for standing and sitting motions. In FIG. 7, a velocity V of the center of gravity is expressed by a magnitude Vx of a coordinate on the x-axis and a magnitude Vy of a coordinate on the y-axis. That is, V=(Vx, Vy).

When a wearer stands or sits, the wearer's center of gravity changes in a shape of a pinwheel having four blades on the velocity graph as shown in FIG. 7. That is, the wearer's center of gravity changes in correspondence to a first step (corresponding to a first blade on the graph) in which the wearer bends his/her upper body forward, a second step (corresponding to a second blade on the graph) in which the wearer stands, a third step (corresponding to a third blade on the graph) in which the wearer sits, and a fourth step (corresponding to a fourth blade on the graph) in which the wearer leans his/her upper body back.

In the first blade which corresponds to the first step in which the wearer bends his/her upper body forward, Vx of the center of gravity increases and Vy of the center of gravity decreases, and the movement of the center of gravity changes at a point at which the Vx reaches 0.4 to 0.5 so that the Vx decreases and the Vy increases. In the second blade which corresponds to the second step in which the wearer stands, Vx of the center of gravity decreases and Vy of the center of gravity increases, and the movement of the center of gravity changes at a point at which the Vy reaches 0.6 to 0.7 so that the Vx increases and the Vy decreases. Then, at a point at which Vy reaches 0.2 to 0.4, the movement of the center of gravity again changes so that Vx decreases, and Vy decreases.

In the third blade which corresponds to the third step in which the wearer sits, Vx of the center of gravity decreases and Vy of the center of gravity decreases, and the movement of the center of gravity changes at a point at which the Vy reaches −0.2 to −0.4 so that the Vx increases and the Vy decreases. Then, at a point at which Vy reaches −0.6 to −0.7, the movement of the center of gravity again changes so that Vx decreases, and Vy increases. In the fourth blade which corresponds to the fourth step in which the wearer leans his/her upper body back, Vx of the center of gravity decreases and Vy of the center of gravity increases, and the movement of the center of gravity changes at a point at which the Vx reaches −0.2 to −0.3 so that Vx increases and Vy decreases.

The velocity calculator 220 may calculate a velocity of the wearer's center of gravity to detect a change in velocity of the center of gravity.

The motion determiner 230 may determine the wearer's intended motion, based on the velocity of the center of gravity, acquired from the velocity calculator 230, and pressure measured by the pressure sensor 100. More specifically, the motion detector 230 may determine whether the wearer intends to stand or sit. The motion determiner 230 will be described in more detail with reference to FIGS. 8 to 10.

Figure 8:
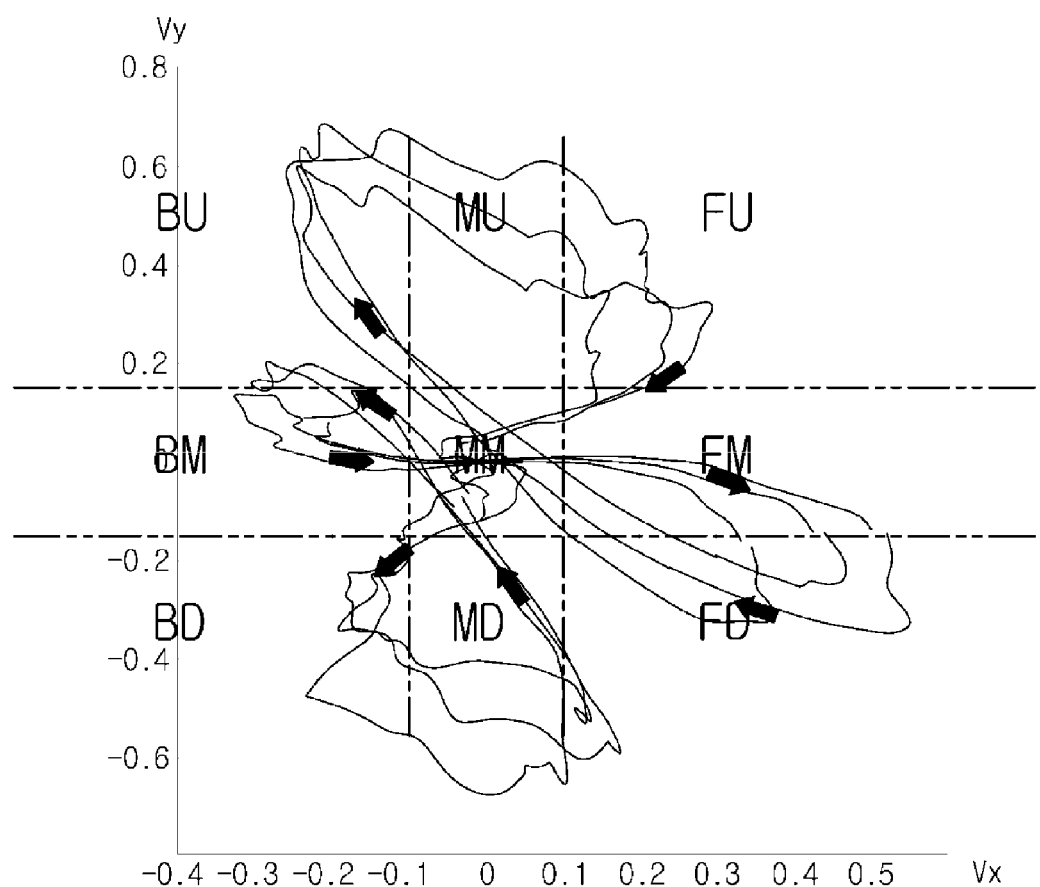
FIG. 8 is the velocity graph of FIG. 7 divided into nine regions.

FIG. 8 is the velocity graph of FIG. 7 divided into nine regions.

Referring to FIG. 8, the velocity graph of FIG. 7 may be divided into nine regions of BU, MU, FU, BM, MM, FM, BD, MD, and FD. More specifically, an area (a part in which Vx decreases and Vy increases, and a part in which Vx increases and Vy starts decreasing) in which Vx of the center of gravity is below −0.1 in the second blade corresponding to the second step in which the wearer stands, and an area (a tail part in which Vx decreases and Vy increases) in which Vy is above 0.15 in the fourth blade may be defined as a BU region. An area (a mid part in which Vx increases and Vy decreases) in which Vx of the center of gravity is between −0.1 and 0.1 in the second blade is defined as a MU region, and an area (a tail part in which Vx increases, and Vy decreases, and a part in which Vx decreases, and Vy starts decreasing) in which Vx is above 0.1 in the second blade is defined as a FU region.

An area (a part in which Vx decreases and Vy decreases, and a part in which Vx increases and Vy starts decreasing) in which Vx of the center of gravity is below −0.1 in the third blade corresponding to the third step in which the wearer sits is defined as a BD region, and an area (a mid part in which Vx increases and Vy decreases) in which Vx is between −0.1 and 0.1 in the third blade is defined as a MD region. An area (a part in which Vx decreases, and Vy starts increasing) in which Vx of the center of gravity is above 0.1 in the third blade, and an area (a part in which Vx decreases and Vy starts increasing) in which Vy is below −0.15 in the first blade corresponding to the first step in which the wearer bends his/her upper body forward is defined as a FD region.

Also, an area (a mid part in which Vx decreases and Vy increases, and a part in which Vx increases and Vy decreases) in which Vy of the center of gravity is between −0.15 and 0.15 in the fourth blade corresponding to the fourth step in which the wearer leans his/her upper body back is defined as a BM region, and an area (a part in which Vx increases and Vy decreases) in which Vy of the center of gravity is between −0.15 and 0.15 in the first blade corresponding to the first step in which the wearer bends his/her upper body forward is defined as a FM region. Also, an area in which the four blades meet, that is, an area in which Vx of the center of gravity is between −0.1 and 0.1 and Vy of the center of gravity is between −0.15 and 0.15 is defined as a MM region.

FIG. 8 shows an example of dividing a velocity graph into nine regions. Reference values of Vx for dividing the velocity graph into nine regions may be other values than −0.1 or 0.1, and likewise, reference values of Vy for dividing the velocity graph into nine regions may also be other values than −0.15 or 0.15.

The reference values of Vx for dividing the velocity graph into nine regions are defined as first direction reference values, and the reference values of Vy for dividing the velocity graph into nine regions are defined as second direction reference values. The first and second direction reference values are defined as first reference values. The first reference values may be set in advance to predetermined values, and stored in the storage unit 300 which will be described later. Also, the first reference values may be received from a wearer through a manipulation unit.

Figure 9:
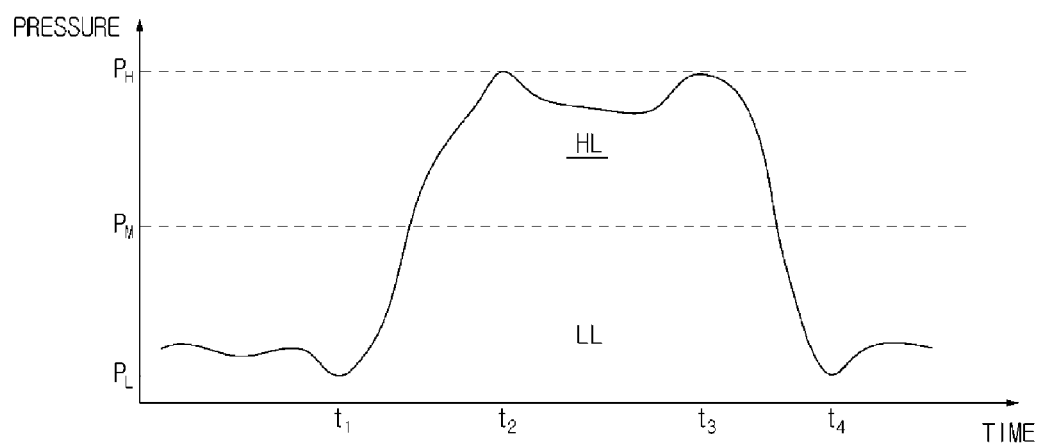
FIG. 9 is a graph showing pressure measured by a pressure sensor and divided into two regions.

FIG. 9 is a graph showing pressure measured by a pressure sensor and divided into two regions.

Referring to FIGS. 2 and 9, when a wearer stands and sits, the pressure sensor 100 installed in the foot rest unit 15 may measure pressure as shown in FIG. 9. More specifically, the pressure sensor 100 may measure low pressure close to PL until a time t1. Then, the pressure sensor 100 may measure sharply increasing pressure between t1 and t2. Then, the pressure sensor 100 may measure high pressure close to PH between t2 and t3, and measure sharply decreasing pressure between t3 and t4. The pressure may decrease to approach PL, and after t4, the pressure sensor 100 may measure low pressure close to PL.

Based on the measured pressure, a state in which the wearer is seated until t1, starts standing at t1, and is standing between t2 and t3 can be recognized. Also, a state in which the standing wearer starts sitting at t3 and is seated after t4 can be recognized.

The pressure graph may be divided into two regions based on a reference value PM between PL and PH. A region having pressure higher than PM is defined as a HL region, and a region having pressure lower than PM is defined as a LL region.

The reference value PM may be set in various methods as necessary. For example, the reference value PM may be set to half PH. That is, if PH is 40, PM may be set to 20. As another example, the reference value PM may be set to an average value of PL and PH. That is, if PL is 2 and PH is 40, PM may be set to 21 which is an average value of 2 and 40.

The reference value PM for dividing the pressure graph into two regions is defined as a second reference value. The second reference value PM may be set in advance, and stored in the storage unit 300 which will be described later. Also, the second reference value PM may be received from a wearer through a manipulation unit.

As shown in FIG. 8, the velocity graph of the center of gravity may be divided into or defined as nine regions, and as shown in FIG. 9, the pressure graph may be divided into or defined as two regions. The motion determiner 230 may determine a wearer's intended motion using the defined regions, and a method in which the motion determiner 230 determines a wearer's intended motion using the defined regions will be described with reference to FIG. 10, below. FIG. 10 is a table related to standing and sitting motions.

Referring to FIG. 10, the vertical axis of the table is divided into HL and LL, and each of HL and LL is divided into U, M, and D. The horizontal axis of the table is divided into B, M, and F.

The table may represent the regions defined as shown in FIGS. 8 and 9. For example, if the controller 200 determines the motion B from the horizontal axis of the table, and HL, more specifically, M of HL from the vertical axis of the table, the BM region shown in FIG. 8 and the HL region shown in FIG. 9 can be represented from a combination of B and M of HL. As another example, if the controller 200 determines the region F from the horizontal axis of the table, and LL, more specifically, D of LL from the vertical axis of the table, the FD region shown in FIG. 8 and the LL region shown in FIG. 9 can be represented from a combination of F and D of LL.

Also, the table may represent a wearer's motion corresponding to each region. More specifically, if the controller 200 determines that a wearer's motion corresponds to the HL region and the BU, MU or FU region, the controller 200 may determine that the wearer's motion is an ascending motion in which the wearer stands. If the controller 200 determines that a wearer's motion corresponds to the HL region and the BD, MD or FD region, the controller 200 may determine that the wearer's motion is a descending motion in which the wearer sits. Also, if a wearer's motion corresponds to the HL region and the MM region, the controller 200 may determine that the wearer's motion is a stabilization motion in which the wearer is standing.

Also, if a wearer's motion corresponds to the LL region and the FU, FM or FD region, the controller 200 may determine that the wearer's motion is a forwarding motion in which the wearer bends his/her upper body forward. If a wearer's motion corresponds to the LL region and the BU, BM or BD region, the controller 200 may determine that the wearer's motion is a backwarding motion in which the wearer leans his/her upper body back. Also, if a wearer's motion corresponds to the LL region and the MM region, the controller 200 may determine the wearer's motion is a stabilization motion in which the wearer is seated.

The motion determiner 230 may determine which region each of a velocity of the center of gravity, acquired from the velocity calculator 230, and pressure measured by the pressure sensor 100 corresponds to, and determine the wearer's intended motion based on the table.

For example, if Vx and Vy of the center of gravity, calculated from the velocity calculator 230 are −0.2 and 0.4, respectively, and pressure measured by the pressure sensor 100 is higher than PM, the motion determiner 230 may determine that a wearer's motion corresponds to the BU region on the velocity graph and the HL region on the pressure graph. Then, the motion determiner 230 may determine a state in which the wearer stands (ascending), based on the table of FIG. 10, and determine the wearer's intended motion as a standing motion.

As another example, if Vx and Vy of the center of gravity, calculated from the velocity calculator 230 are −0.2 and −0.4, respectively, and pressure measured by the pressure sensor 100 is higher than PM, the motion determiner 230 may determine that a wearer's motion corresponds to the BD region on the velocity graph and the HL region on the pressure graph. Then, the motion determiner 230 may determine a state in which the wearer sits (descending), based on the table of FIG. 10, and determine the wearer's intended motion as a sitting motion.

The torque calculator 240 may calculate torque that is to be generated in the joint units 11, 21, and 31, based on the wearer's intended motion. This will be described in detail with reference to FIGS. 11 and 12, below.

Figure 11:
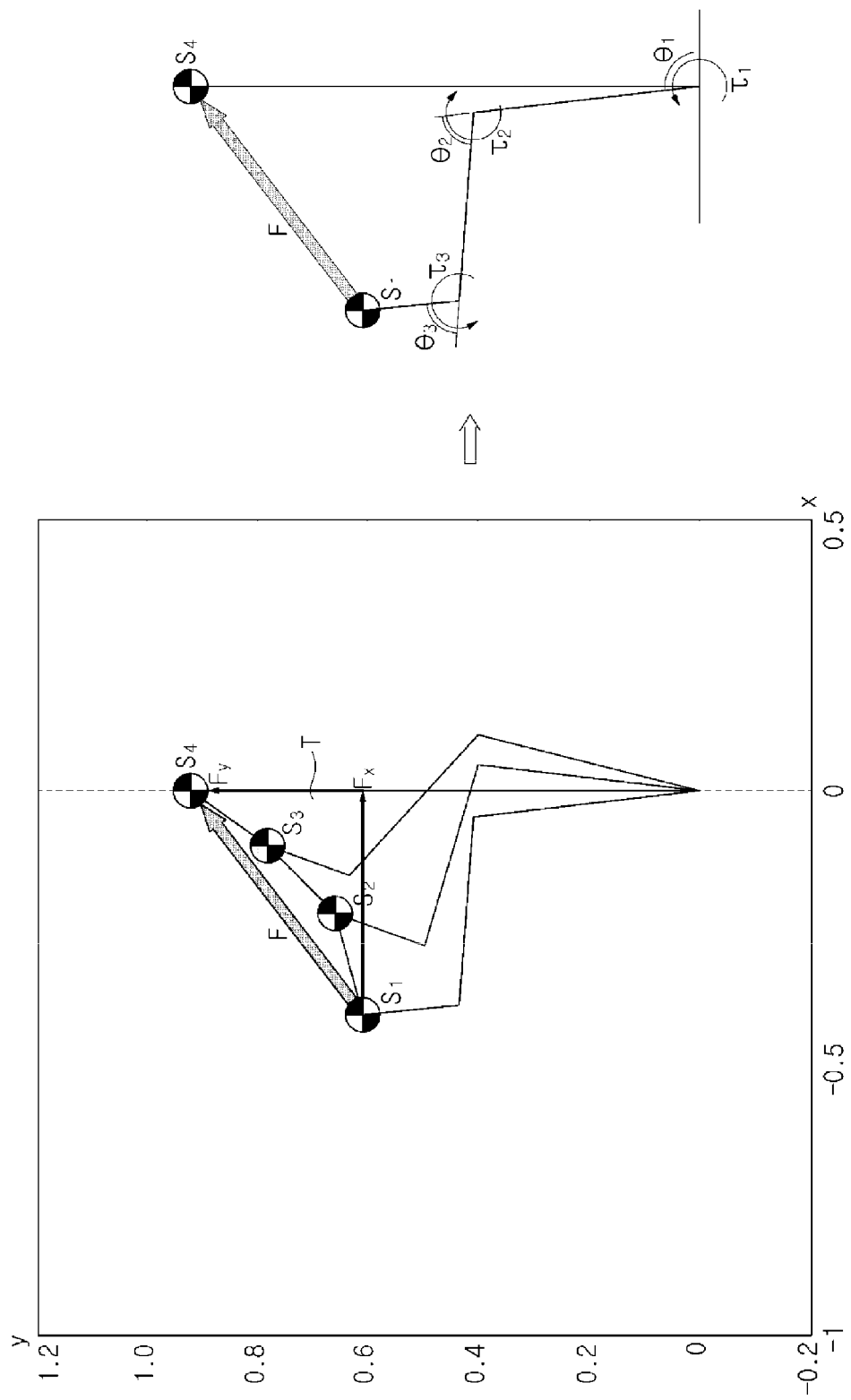
FIG. 11 is a view for describing an example of torque that is generated when a wearer stands.

FIG. 11 is a view for describing an example of torque that is generated when a wearer stands.

In order for a sitting wearer to stand, a force is needed. That is, in order to convert a state (operation 51) in which a wearer is seated to a state (operation S4) in which the wearer is standing, a desired (or, alternatively, a predetermined) force F for moving the center of gravity may be applied, as shown in the left side of FIG. 11. The force F may include Fx that is applied in an x-axis direction and Fy that is applied in a y-axis direction. That is, $$F = \begin{bmatrix} F_x \\ F_y \end{bmatrix}.$$

By adding the force F to the center of gravity, the controller 200 may generate torque in individual connection parts as shown in the right side of FIG. 11. As described above, in the state (operation S1) in which the wearer is seated, the angle θ1 of the first link 28 with respect to the ground, the angle θ2 of the second link 38 with respect to the first link 28, and the angle θ3 of the third link 48 with respect to the second link 38 are nearly 90°. In the state (operation S2) in which the wearer is standing, the angles θ1, θ2, and θ3 become 0°. Accordingly, in order to convert the operation S1 to the operation S4, torque τ1, τ2, and τ3 for changing the angles θ1, θ2, θ3 that are nearly 90° to 0° may be generated in the respective connection parts. That is, torque τ1 for changing θ1 to 0° may be generated in the connection part between the first link 28 and the ground, torque τ2 for changing θ2 to 0° may be generated in the connection part between the first link 28 and the second link 38, and torque τ3 for changing θ3 to 0° may be generated in the connection part between the second link 38 and the third link 48.

Meanwhile, in order to decide the force F for moving the center of gravity, and in order to calculate torque that is generated in each connection part, the following equations (2), (3), and (4) may be used. The controller 200 may determine the force F using equation (2), below.

$$F = k_a \cdot v + k_b \cdot (p_d - p_c), \quad (2)$$

where v is a velocity of the center of gravity, $P_d$ is a final position of the center of gravity, $P_c$ is a current position of the center of gravity, and $k_a$ and $k_b$ are constants.

The controller 200 may determine the torque using equation (3), below.

$$\tau = J^T \cdot F, \quad (3)$$

where $\tau$ is torque $\tau_1$, $\tau_2$, and $\tau_3$, that is, $$\tau = \begin{bmatrix} \tau_1 \\ \tau_2 \\ \tau_3 \end{bmatrix},$$

F is the force for moving the center of gravity, J is a Jacobean matrix, and T is transpose.

The Jacobean matrix J may be a matrix such as equation 4, below.

$$J = [\, J_1 \quad J_2 \quad J_3 \,] \quad (4)$$

where $$J_1 = \begin{bmatrix} -l_{21}\sin(\theta_1) - l_{22}\sin(\theta_1 + \theta_2) - l_{23}\sin(\theta_1 + \theta_2 + \theta_3) \\ l_{21}\cos(\theta_1) + l_{22}\cos(\theta_1 + \theta_2) + l_{23}\cos(\theta_1 + \theta_2 + \theta_3) \end{bmatrix},$$

$$J_2 = \begin{bmatrix} -l_{22}\sin(\theta_1 + \theta_2) - l_{23}\sin(\theta_1 + \theta_2 + \theta_3) \\ l_{22}\cos(\theta_1 + \theta_2) + l_{23}\cos(\theta_1 + \theta_2 + \theta_3) \end{bmatrix}, \text{ and}$$

$$J_3 = \begin{bmatrix} -l_{23}\sin(\theta_1 + \theta_2 + \theta_3) \\ l_{23}\cos(\theta_1 + \theta_2 + \theta_3) \end{bmatrix}.$$

where $I_{21}$, $I_{22}$, and $I_{23}$ are the lengths of the first link 28, the second link 38, and the third link 48, respectively, $\theta_1$ is an angle of the first link 28 with respect to the ground, $\theta_2$ is an angle of the second link 38 with respect to the first link 28, and $\theta_3$ is an angle of the third link 48 with respect to the second link 38.

If the motion determiner 230 determines that a wearer's motion is a standing motion, the torque calculator 240 may calculate torque $\tau_1$, $\tau_2$, and $\tau_3$ that is to be generated in the respective connection parts.

The torque calculator 240 may calculate the torque $\tau_1$, $\tau_2$, and $\tau_3$ based on the second structure, that is, based on the 3-link structure that has changed. Meanwhile, as described above, generating torque in the individual connection parts of the second structure may be the same as generating torque in the individual connection parts of the first structure. As a result, the torque calculator 240 calculates torque $\tau_1$, $\tau_2$, and $\tau_3$ that are to be generated in the joint units 11, 21, and 31. More specifically, the torque calculator 240 may calculate torque $\tau_1$ that is to be generated in the first joint 11 of the first structure, torque $\tau_2$ that is to be generated in the second joint 21 of the first structure, and torque $\tau_3$ that is to be generated in the third joint 31 of the first structure, respectively.

Figure 12:
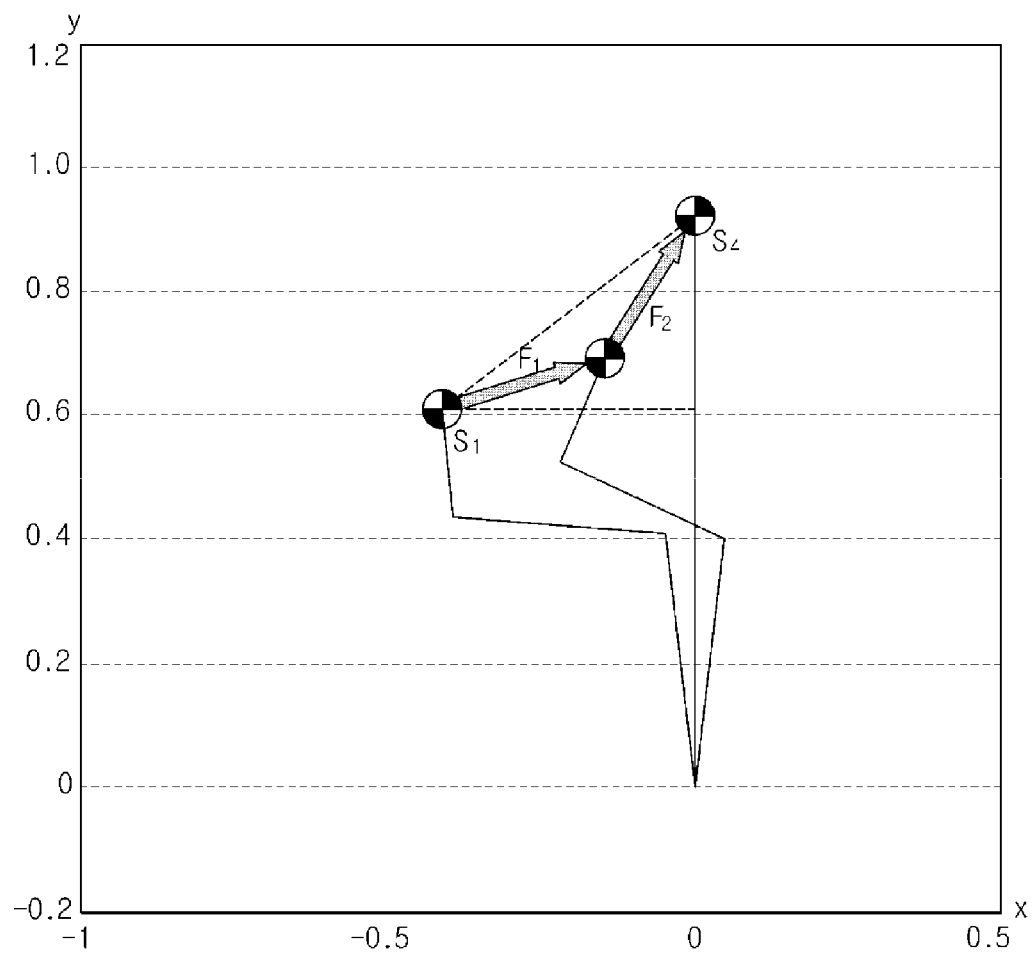
FIG. 12 is a view for describing another example of torque that is generated when a wearer stands.

FIG. 12 is a view for describing another example of torque that is generated when a wearer stands.

In the example of FIG. 12, unlike the example of FIG. 11, a state (operation S1) in which a wearer is seated is converted to a state (operation S4) in which the wearer is standing, via an intermediate operation. In order to convert the operation S1 to the intermediate operation, a desired (or, alternatively, a predetermined) force F1 may be added to the center of gravity, and in order to convert the intermediate operation to the operation S4, a desired (or, alternatively, a predetermined) force F2 is added to the center of gravity.

In order to add the force F1 to the center of gravity, first torque may be generated in the individual connection parts. Also, in order to add the force F2 to the center of gravity, second torque may be generated in the individual connection parts.

The torque calculator 240 may calculate the first torque and the second torque that are to be generated in the individual connection parts, using equations (2), (3), and (4). In other words, the torque calculator 240 may calculate the first torque and the second torque that are to be generated in the joint units 11, 21, and 31 of the first structure.

FIG. 12 relates to a case in which there is one intermediate operation, however, there may be a plurality of intermediate operation. If there are a plurality of intermediate steps, the torque calculator 240 may calculate torque a number of times corresponding to the number of the intermediate operations. That is, if there is n intermediate operation, the torque calculator 240 may calculate 1st torque to (n+1)th torque in correspondence to the n intermediate operations, wherein n is an integer equal to or greater than 1.

FIGS. 11 and 12 relate to examples in which the torque calculator 240 calculates torque that is to be generated in the joint units 11, 21, and 31 when the motion determiner 230 determines that a wearer's intended motion is a standing motion.

Likewise, when the motion determiner 230 determines that the wearer's intended motion is a sitting motion, the torque calculator 240 may also calculate torque that is to be generated in the joint units 11, 21, and 31. In this case, the torque calculator 240 may calculate torque using the above-described examples inversely.

The driving controller 250 may output control signals to the drivers 400 based on the values calculated by the torque calculator 240 so as to generate torque in the joint units 11, 21, and 31. Details about this operation will be described again with reference to FIG. 11.

As described above with reference to FIG. 11, the torque calculator 240 may calculate torque $\tau_1$ that is to be generated in the first joint 11, torque $\tau_2$ that is to be generated in the second joint 21, and torque $\tau_3$ that is to be generated in the third joint 31, respectively.

Based on the torque $\tau_1$, $\tau_2$, and $\tau_3$, the driving controller 250 may output a control signal to the driver 400 of the first joint 11 so that the torque $\tau_1$ is generated in the first joint 11, output a control signal to the driver 400 of the second joint 21 so that the torque $\tau_2$ is generated in the second joint 21, and output a control signal to the driver 400 of the third joint 31 so that the torque $\tau_3$ is generated in the third joint 31.

If the drivers 400 generate torque in the respective joints 11, 21, and 31 according to the control signals, the respective joints 11, 21, and 31 move or rotate according to the generated torque. For example, when the wearer stands, like the example of FIG. 11, the respective joints 11, 21, and 31 move or rotate such that all the angles $\theta_1$, $\theta_2$, and $\theta_3$ become 0°.

The movements or rotations of the joint units 11, 21, and 31 assist joints of the wearer's lower extremities when the wearer stands or sits.

The storage unit 300 may store data or algorithms for manipulating the wearable robot 1.

As an example of data storage, the storage unit 300 may store the reference values Vx and Vy for dividing the velocity graph, and the reference value PM for dividing the pressure graph. Further, the storage unit 300 may store a table related to standing and sitting motions.

In other example embodiments, the storage unit 300 may store an algorithm for calculating a position and a velocity of the center of gravity, an algorithm for determining a wearer's intended motion based on the table as shown in FIG. 10, and an algorithm for calculating torque that is to be generated in the joint units 11, 21, and 31.

The storage unit 300 may be a non-volatile memory device, such as Read Only Memory (ROM), Programmable Read Only Memory (PROM), an Erasable Programmable Read Only Memory (EPROM), and a flash memory, a volatile memory device such as Random Access Memory (RAM), a hard disk, or an optical disk. However, the storage unit 300 is not limited to these, and may be any other storage device well known in the art.

The components of the wearable robot 1 and the functions of the components have been described above, and hereinafter, a control method of the wearable robot 1 will be described with reference to a flowchart.

FIG. 13 is a flowchart illustrating a control method of the wearable robot 1, according to some example embodiments.

Referring to FIG. 13, in operation 500, the controller 200 may calculate a position of a wearer's center of gravity.

In operation 510, the controller 200 may calculate a velocity of the wearer's center of gravity based on the position of the wearer's center of gravity. Further, the pressure sensor 100 installed in the foot rest unit 15 may measure pressure.

In operation 520, the controller 200 may determine the wearer's intended motion based on the velocity of the wearer's center of gravity and the measured pressure. More specifically, the controller 200 may determine the wearer's movement state based on the velocity of the wearer's center of gravity and the measured pressure. Further, the controller 200 may determine the wearer's intended motion based on the wearer's movement state.

In detail, the velocity V of the wearer's center of gravity is divided into a velocity magnitude Vx on the x-axis and a velocity magnitude Vy on the y-axis. That is, V=(Vx, Vy). Vx may be compared to at least one first direction reference value of first reference values, and Vy may be compared to at least one second direction reference value of the first reference values. Also, the measured pressure may be compared to a second reference value.

If Vx is equal to or smaller than a minimum value of the first direction reference values, and the pressure is smaller than the second reference value, the wearer's movement state is determined to be a state in which the wearer leans his/her upper body back. If Vx is equal to or greater than a maximum value of the first direction reference values, and the pressure is smaller than the second reference value, the wearer's movement state is determined to be a state in which the wearer bends his/her upper body forward. Also, if Vy is equal to or smaller than a minimum value of the second direction reference values, and the pressure is equal to or greater than the second reference value, the wearer's movement state is determined to be a state in which the wearer sits. If Vy is equal to or greater than a maximum value of the second direction reference values, and the pressure is equal to or greater than the second reference value, the wearer's movement state is determined to be a state in which the wearer stands.

If Vx is between the minimum value and the maximum value of the first direction reference values, Vy is between the minimum value and the maximum value of the second direction reference values, and the pressure is smaller than the second reference value, the wearer's movement state is determined to be a state in which the wearer is seated. If Vx is between the minimum value and the maximum value of the first direction reference values, Vy is between the minimum value and the maximum value of the second direction reference values, and the pressure is equal to or greater than the second reference value, the wearer's movement state is determined to be a state in which the wearer is standing.

Meanwhile, if the wearer's movement state is determined to be a state in which the wearer stands, the wearer's intended motion is determined to be a standing motion. Also, if the wearer's movement state is determined to be a state in which the wearer sits, the wearer's intended motion is determined to be a sitting motion.

In operation 530, if the wearer's intended motion is determined to be a standing motion or a sitting motion, the controller 200 may calculate torque that is generated in the individual joint units 11, 21, and 31.

In operation 540, the controller 200 may output control signals to the drivers 400 included in the individual joint units 11, 21, and 31 based on the calculated torque. Accordingly, the same torque as the calculated torque may be generated in the individual joint units 11, 21, and 31.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A wearable robot comprising:
at least one link configured to support a wearer of the wearable robot;
at least one joint configured to connect the links to each other;
a controller configured to,
detect a first position of a center of gravity of the wearer,
detect a second position of the center of gravity of the wearer,
determine a velocity of the center of gravity of the wearer based on a time and a distance between the first position and the second position,
determine magnitudes of the velocity in a first direction and a second direction, the second direction being perpendicular to the first direction,
determine an intended motion of the wearer based on the magnitudes of the velocity of the center of gravity of the wearer, and
calculate at least one torque based on the intended motion; and
a driver configured to generate the calculated torque in the joints.

2. The wearable robot according to claim 1, further comprising:
a pressure sensor configured to sense pressure due to a weight of the wearer, wherein
the controller is configured to determine a movement state of the wearer based on the calculated velocity and the sensed pressure, and determine the intended motion of the wearer based on the movement state.

3. The wearable robot according to claim 2, wherein the controller is configured to determine the movement state of the wearer by,
comparing the calculated velocity of the center of gravity of the wearer to one of first reference values, and
comparing the sensed pressure to one of second reference values.

4. The wearable robot according to claim 3, wherein the controller is configured to,
compare a magnitude in a first direction of the calculated velocity of the center of gravity of the wearer to at least one first direction reference value of the first reference values, and compare a magnitude in a second direction of the calculated velocity of the center of gravity of the wearer to at least one second direction reference value of the first reference values.

5. The wearable robot according to claim 4, wherein the first direction is perpendicular to the second direction.

6. The wearable robot according to claim 4, wherein the controller is configured to determine the movement state as state in which the wearer is leaning back, if the magnitude in the first direction is equal to or smaller than a minimum value of the at least one first direction reference value, and the sensed pressure is smaller than the second reference value.

7. The wearable robot according to claim 4, wherein the controller is configured to determine the movement state as a state in which the wearer is bending forward, if the magnitude in the first direction is equal to or greater than a maximum value of the at least one first direction reference value, and the sensed pressure is smaller than the second reference value.

8. The wearable robot according to claim 4, wherein controller is configured to determine the movement state as a state in which the wearer is sitting down, if the magnitude in the second direction is equal to or smaller than a minimum value of the at least one second direction reference value, and the sensed pressure is equal to or greater than the second reference value.

9. The wearable robot according to claim 4, wherein the controller is configured to determine the movement state as a state in which the wearer is standing up, if the magnitude in the second direction is equal to or greater than a maximum value of the at least one second direction reference value, and the sensed pressure is equal to or greater than the second reference value.

10. The wearable robot according to claim 4, wherein the controller is configured to determine the movement state as a state in which the wearer is seated, if the magnitude in the first direction is between a minimum value and a maximum value of the at least one first direction reference value, the magnitude in the second direction is between a minimum value and a maximum value of the at least one second direction reference value, and the sensed pressure is smaller than the second reference value.

11. The wearable robot according to claim 4, wherein the controller is configured to determine the movement state as a state in which the wearer is standing, if the magnitude in the first direction is between a minimum value and a maximum value of the at least one first direction reference value, the magnitude in the second direction is between a minimum value and a maximum value of the at least one second direction reference value, and the sensed pressure is equal to or greater than the second reference value.

12. The wearable robot according to claim 2, wherein if the controller determines that the movement state is a state in which the wearer stands, the controller is configured to determine that the intended motion of the wearer is a standing motion.

13. The wearable robot according to claim 2, wherein if the controller determines that the movement state is a state in which the wearer sits, the controller is configured to determine that the wearer's intended motion is a sitting motion.

14. The wearable robot according to claim 1, wherein the controller is configured to calculate the torque, if the controller determines that the wearer's intended motion is a standing motion or a sitting motion.

15. The wearable robot according to claim 1, wherein the controller is configured to calculate the torque n times so that the wearable robot assists the wearer in performing the intended motion through n steps, wherein n≥1.

16. The wearable robot according to claim 1, wherein the controller is configured to calculate the torque using the following equation:

$$\tau_i = J^T \cdot F,$$

where i is at least one torque, F is a force for moving the center of gravity of the wearer, J is a Jacobean matrix, and T is transpose.

17. A control method of a wearable robot comprising:
detecting a first position of a center of gravity of a wearer of the wearable robot;
detecting a second position of the center of gravity of the wearer;
determining a velocity of the center of gravity of the wearer based on a time and a distance between the first position and the second position;
determining magnitudes of the velocity in a first direction and a second direction, the second direction being perpendicular to the first direction;
determining an intended motion of a wearer of the wearable robot based on the magnitudes of the velocity of the center of gravity of the wearer;
calculating at least one torque based on the intended motion; and
generating the calculated torque in one or more joints connecting one or more links of the wearable robot to each other.

18. The control method according to claim 17, further comprising:
measuring pressure via a pressure sensor, wherein
the determining of the intended motion includes,
determining a movement state of the wearer based on the calculated velocity and the measured pressure, and
determining the intended motion of the wearer based on the movement state.

* * * * *